(No Model.)
J. H. WISEHEART.
TRACE CONNECTION FOR VEHICLE SHAFTS.
No. 543,225. Patented July 23, 1895.
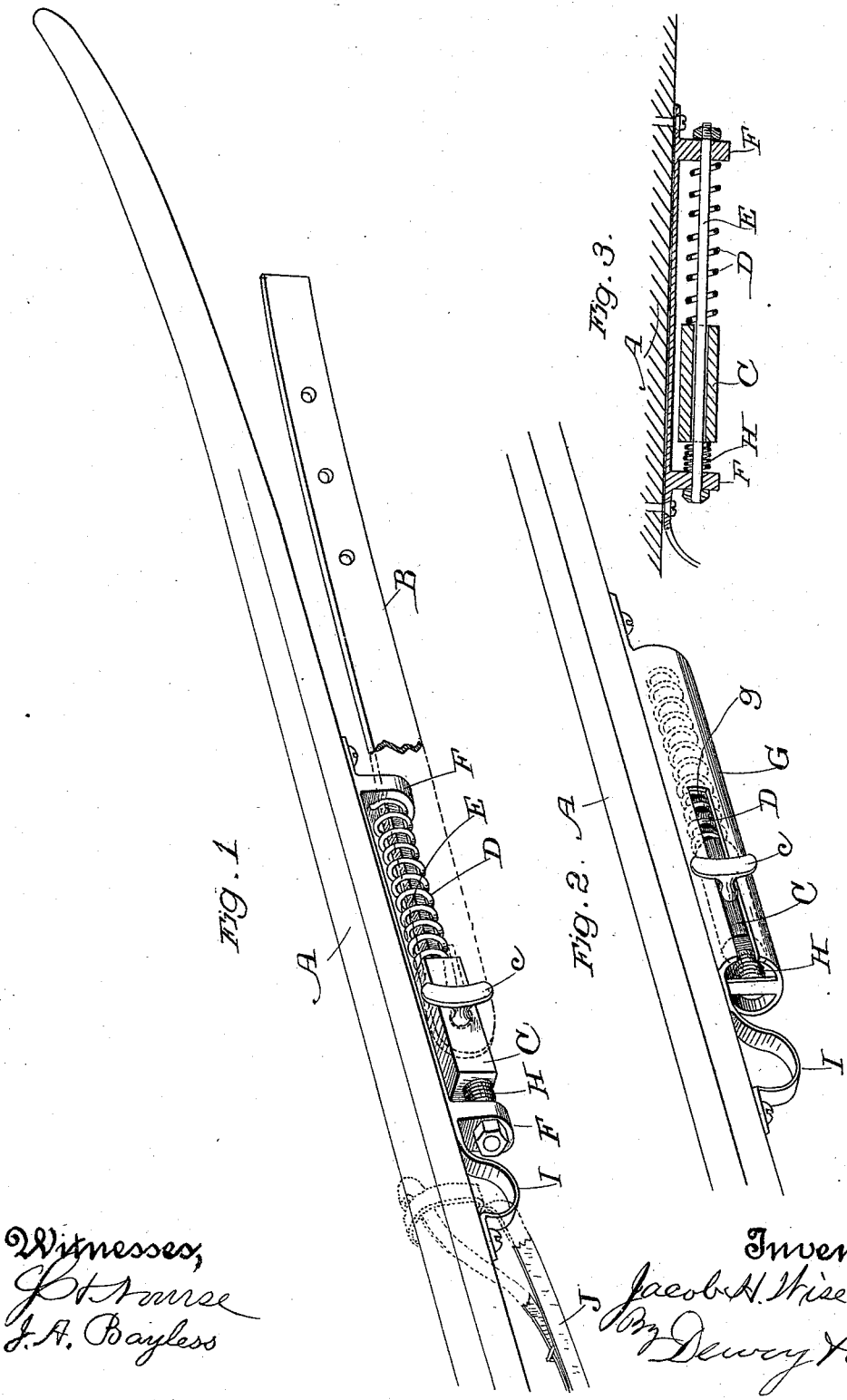

UNITED STATES PATENT OFFICE.

JACOB HENDRIX WISEHEART, OF SACRAMENTO ASSIGNOR TO JOHN MASON, OF PETALUMA, CALIFORNIA.

TRACE CONNECTION FOR VEHICLE-SHAFTS.

SPECIFICATION forming part of Letters Patent No. 543,225, dated July 23, 1895.

Application filed November 30, 1894. Serial No. 530,472. (No model.)

*To all whom it may concern:*

Be it known that I, JACOB HENDRIX WISEHEART, a citizen of the United States, residing in Sacramento, county of Sacramento, State of California, have invented an Improvement in Trace and Shaft Connections; and I hereby declare the following to be a full, clear, and exact description of the same.

My invention relates to the general class of connections between harness and vehicles, and particularly to connections between the traces or tugs of the harness and the shafts of the vehicle.

The object of my invention is to avoid the necessity of a long trace or tug.

These parts of a harness, as is well known, are buckled at their forward ends to the hames or to the breast-strap, as the case may be, and thence extend backwardly the whole length of the body of the horse and are looped over connections upon the ends of the singletree, pivoted upon the top of the cross-bar of the shafts. The traces or tugs are thus very long, and in unhitching a horse care must be taken in disposing of these long parts, which is usually done by either laying them up over the back of the horse or tying them in a loose knot, and in either case they are liable to become undone and fall down upon the ground and get dirty, even if not injured by the horse stepping upon them, or in some cases resulting in accident to the harness, the vehicle, or the horse; but by dispensing with these long tugs or traces these disadvantages are avoided, and, incidentally, by dispensing with the singletree it may be observed that the cost of the connection which I shall hereinafter describe is about compensated for.

My invention consists in a connection between the shafts and the traces or tugs, which latter are made comparatively short, said connection being of such a yielding character as to provide for the effect of the swaying of the horse in the same manner that the pivoting of the singletree does.

It also consists in the particular connection between the tugs and the shafts, which I shall hereinafter fully describe and specifically claim.

Referring to the accompanying drawings for a more complete explanation of my invention, Figure 1 is a perspective view of my connection. Fig. 2 is a view of the preferred form of mounting. Fig. 3 is a longitudinal section of the device.

A represents the shaft of a vehicle, and B is a short trace or tug of a harness.

C is a slide having a lug c, over which the rear end of the short trace or tug is looped. This slide is connected with the shaft in any suitable manner and is controlled by a spring D, so that it may yield under the pull on the trace or tug and thus fully compensate for the swaying movement of the horse, as is necessary.

In mounting the slide and the spring it may be, as I have shown in Fig. 3, by means of a guide or rod E, secured in the arms of a bracket F, screwed up under the shaft, the slide and the spring being both upon said rod; or it may be, as I have shown in Fig. 2, which is the form which I prefer, by means of a complete guide-housing G, secured under the shaft, said housing having in its inner side a slot $g$, through which the neck of the lug $c$ of the slide C extends and plays, said slide, together with the spring D, being wholly incased within the housing. In both instances I may have on the other side of the slide a spring H to serve as an antirattler.

It will be understood that there is to be a connection of this character upon both shafts.

The bracket F and the housing G may, in order to make them more complete, be formed at their rear ends with the loops I, adapted to receive the holdback-straps J of the harness, from the presence and position of which it will be seen that the tugs or traces B are comparatively short. The spring connection of the traces or tugs also gives greater ease to the horse in starting a heavy load.

Having thus described my invention, what I claim as new, and desire to secure by Letters Patent, is—

1. A connection between trace and shaft consisting of a housing secured under the shaft and having a slot in its side, a slide within the housing having a lug projecting through and operating in the slot thereof, and adapted to receive the trace or tug, a spring seated within the housing and controlling the slide, a second spring on the other side of the slide to prevent rattling and a loop extending rearwardly from the housing with its free end secured to the shaft; said loop adapted to receive the hold back strap.

2. A trace and shaft connection consisting of a guide mounted under the shaft and provided with a loop at its rear end the free end of said loop passing rearwardly and secured to the under side of the shaft, and said loop being adapted for the attachment of the hold back strap, a slide carried by the guide and having means for attaching to it the trace or tug and a spring for controlling the slide.

In witness whereof I have hereunto set my hand.

JACOB HENDRIX WISEHEART.

Witnesses:
M. K. BARRETT,
H. BENNETT.